J. R. Remington.
Scraper.
No. 4,539. Patented May 28, 1846.
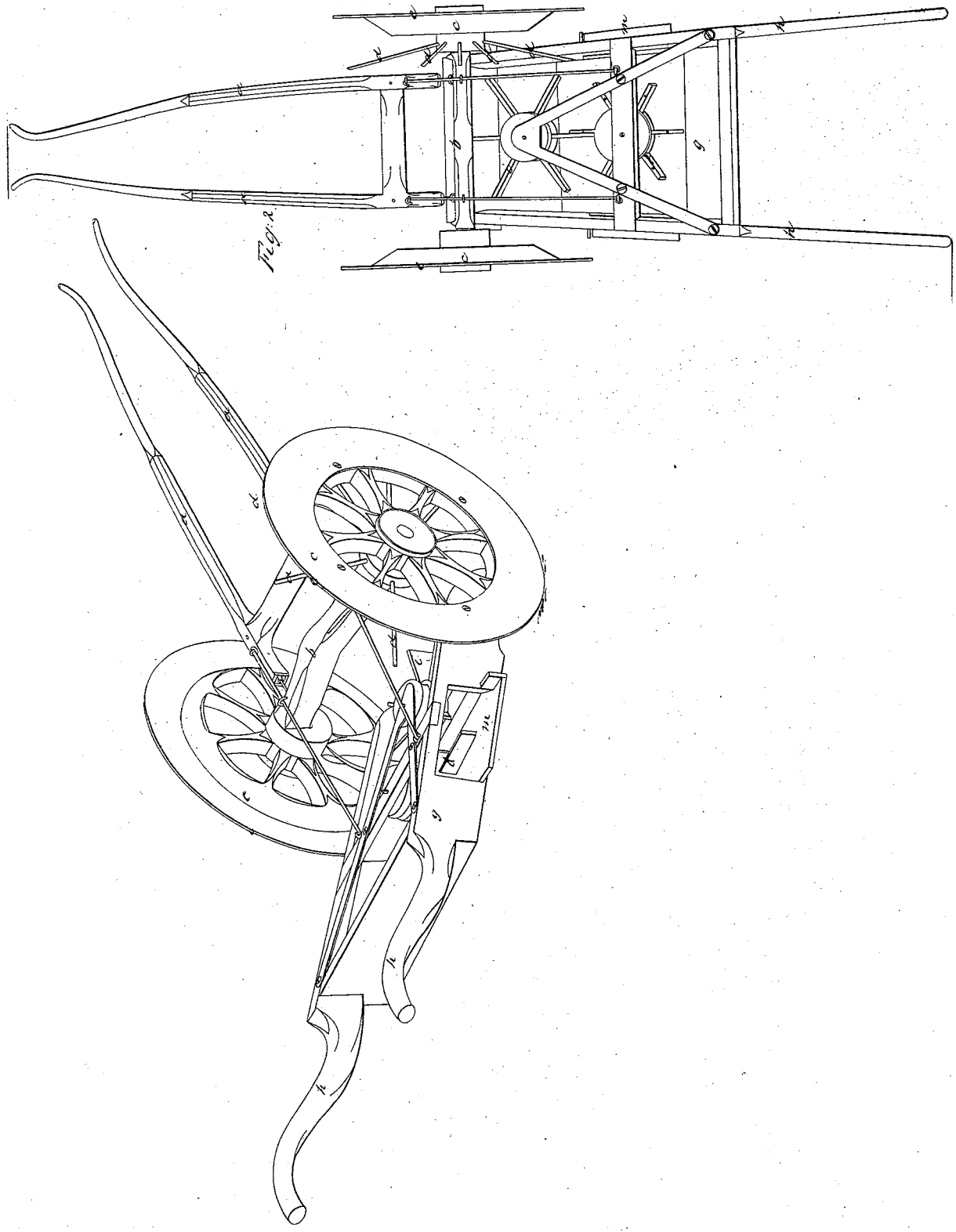

UNITED STATES PATENT OFFICE.

J. R. REMINGTON, OF LOWNDES COUNTY, ALABAMA.

DITCHING-MACHINE.

Specification of Letters Patent No. 4,539, dated May 28, 1846.

*To all whom it may concern:*

Be it known that I, J. R. REMINGTON, of the county of Lowndes and State of Alabama, have invented a new and useful Improvement in Machines for Ditching, and that the following is a full, clear, and exact description of the principle or character thereof which distinguishes it from all other things before known and of the manner of making, constructing, and using the same, reference being had to the accompanying drawings, making part of this specification, in which—

Figure 1 is a perspective view and Fig. 2, a top plan of my machine.

The same letters indicate like parts in all the figures.

The nature of my invention consists in the peculiar adaptation of the principles which govern the operations of the plough by combining with two cutter wheels a large shovel or scraper, in which are revolving clearers gradually paring the sides of the ditch and raising the dirt from the bottom and throwing it to any distance from the ditch or on either side.

The construction is as follows: A pair of shafts ($a$) of common construction are affixed to an axle ($b$) like that of a cart but with the ends a little inclining downward, by which the wheels ($c$) are inclined with their lower side inward at about the angle the sides of ditch are to be on the hub of one of these wheels and inside of it there is a series of spokes or long cogs ($d$), that serves to move a revolving clearer in the scraper hereafter described. The tire on the outer rim of both wheels projects edgeways and forms a circular cutter ($e$).

Rods of iron ($f$) or other suitable connection extend from the upper side of the shafts over the axle to a scraper ($g$) situated behind the axle and connects them together; this scraper is formed like a large shovel with raised sides which project back and form two handles ($h$) behind like a wheelbarrow: the lower or front end of this shovel is armed with steel, and its position is between the wheels at their lowest point in the bottom of this shovel there is a clearer ($i$) consisting of a vertical hub with projecting rings extending out from it to the sides; this is turned by the cogs ($d$) above named on the hub of the wheel, this clearer sweeps back the dirt which is carried still further up and out through an opening ($m$) in the side of the scraper on either side (according to the direction of the revolution) by another clearer ($k$) made like the one below and mashing into it, by which said second clearer is moved. As this machine is drawn forward the wheels cut the sides of the ditch while the dirt between them is lifted and thrown to one side by the scraper.

Having thus fully described my improved ditcher, what I claim therein as new and desire to secure by Letters Patent, is—

The combination of the cutter wheels, scraper, and elevators substantially in the manner and for the purpose above described.

JOHN R. REMINGTON.

Witnesses:
M. BLAIR,
PETER C. HOGG.